US009091303B2

(12) United States Patent
Inohae et al.

(10) Patent No.: US 9,091,303 B2
(45) Date of Patent: Jul. 28, 2015

(54) ROLLING BEARING UNIT WITH ENCODER FOR SUPPORTING WHEEL

(71) Applicant: NSK Ltd., Tokyo (JP)

(72) Inventors: Jyunya Inohae, Kanagawa (JP); Yoshio Kaneko, Kanagawa (JP); Masato Nagano, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/279,730

(22) Filed: May 16, 2014

(65) Prior Publication Data

US 2014/0248013 A1    Sep. 4, 2014

Related U.S. Application Data

(63) Continuation of application No. 13/641,704, filed as application No. PCT/JP2011/052479 on Feb. 7, 2011, now Pat. No. 8,882,358.

(30) Foreign Application Priority Data

Jul. 22, 2010    (JP) .................................. 2010-165014

(51) Int. Cl.
*F16C 13/00*        (2006.01)
*F16C 33/76*        (2006.01)
(Continued)

(52) U.S. Cl.
CPC ........... *F16C 41/007* (2013.01); *B60B 27/0005* (2013.01); *B60B 27/0068* (2013.01);
(Continued)

(58) Field of Classification Search
CPC .. F16C 33/723; F16C 41/007; F16C 2326/02; F16C 2240/30
USPC .................................. 384/448, 489, 544, 589
See application file for complete search history.

(56) References Cited

U.S. PATENT DOCUMENTS 6,217,220 B1    4/2001   Ohkuma et al.
7,980,766 B2 *  7/2011   Tsuzaki ........................ 384/544
(Continued)

FOREIGN PATENT DOCUMENTS

CN      1576061 A       2/2005
DE      19644744 A1     5/1998
(Continued)

OTHER PUBLICATIONS

International Search Report dated Apr. 26, 2011 from the corresponding PCT/JP2011/052479.
(Continued)

*Primary Examiner* — Phillip A Johnson
(74) *Attorney, Agent, or Firm* — Katten Muchin Rosenman LLP

(57) ABSTRACT

Construction is achieved that is able to prevent strain deformation in the axial direction of a flat plate section 21 of a cover 19a when a cylinder section 20 of the cover 19a, which covers the opening on the inside end in the axial direction of an internal space where an encoder 1 is located, is fitted into and fastened to the inside end section in the axial direction of an outer ring 7. A non-contact section 26a is formed all the way around the inside end section in the axial direction of the cylinder section 20 such that the outer diameter is smaller than the inner diameter of the inside end section in the axial direction of the outer ring, and the dimension $L_{26}$ in the axial direction is two times or more the thickness dimension $t_{19}$ of a plate member of the cover 19a. With the cover 19a fitted into the inside end section in the axial direction of the outer ring 7, only the portion of the cylinder section 20 that is nearer the outside in the axial direction than the non-contact section 26a is substantially fitted into the inside end section in the axial direction of the outer ring 7 with an interference fit.

10 Claims, 10 Drawing Sheets

(51) Int. Cl.
   *F16C 41/00* (2006.01)
   *B60B 27/00* (2006.01)
   *B60B 35/02* (2006.01)
   *G01P 3/44* (2006.01)
   *G01P 3/487* (2006.01)
   *F16C 33/72* (2006.01)
   *F16C 19/18* (2006.01)

(52) U.S. Cl.
   CPC ............... *B60B35/02* (2013.01); *F16C 33/723* (2013.01); *F16C 33/768* (2013.01); *G01P 3/443* (2013.01); *G01P 3/487* (2013.01); *B60B 2380/12* (2013.01); *B60B 2380/73* (2013.01); *B60B 2900/325* (2013.01); *B60B 2900/3312* (2013.01); *B60Y 2200/11* (2013.01); *F16C 19/186* (2013.01); *F16C 2240/30* (2013.01); *F16C 2326/02* (2013.01)

(56) References Cited

U.S. PATENT DOCUMENTS

| | | | |
|---|---|---|---|
| 8,393,795 B2 * | 3/2013 | Aritake et al. | 384/489 |
| 8,534,922 B2 | 9/2013 | Takada | |
| 2005/0018939 A1 | 1/2005 | Niwa et al. | |
| 2008/0124017 A1 | 5/2008 | Umekida | |

FOREIGN PATENT DOCUMENTS

| | | |
|---|---|---|
| EP | 1 431 071 | 6/2004 |
| EP | 1500524 A2 | 1/2005 |
| EP | 1 956 274 | 8/2008 |
| EP | 2 098 739 | 9/2009 |
| JP | 2000249138 A | 9/2000 |
| JP | 2003-13982 A | 1/2003 |
| JP | 2003-42175 A | 2/2003 |
| JP | 2003-159904 A | 6/2003 |
| JP | 2005-59831 A | 3/2005 |
| JP | 2005-133953 A | 5/2005 |
| JP | 2005-140192 A | 6/2005 |
| JP | 2007-278518 A | 10/2007 |
| JP | 4003446 B2 | 11/2007 |
| JP | 2007-320471 | 12/2007 |
| JP | 2010-78018 A | 4/2010 |
| JP | 2010078018 A | 4/2010 |
| JP | 2010-106909 A | 5/2010 |
| JP | 2010-151279 A | 7/2010 |
| JP | 2010-190421 | 9/2010 |
| KR | 10-2005-0012680 | 2/2005 |
| WO | 2010/050201 A1 | 5/2010 |

OTHER PUBLICATIONS

Notice of Allowance dated May 1, 2014, from the corresponding U.S. Appl. No. 13/641,704.

Office Action dated Oct. 18, 2013, from the corresponding U.S. Appl. No. 13/641,704.

Supplementary European Search Report dated Nov. 20, 2013 from corresponding Application No. EP 11 80 9471.

Office Action dated Mar. 4, 2014, from the corresponding Chinese Patent Application No. 201180000026.0.

* cited by examiner (A)

(B)

ROLLING BEARING UNIT WITH ENCODER FOR SUPPORTING WHEEL

CROSS-REFERENCE TO RELATED APPLICATIONS

This application is a continuation of and claims priority to U.S. Ser. No. 13/641,704, which was filed Dec. 18, 2012, is pending, and is hereby incorporated by reference in its entirety for all purposes.

U.S. Ser. No. 13/641,704 is National Stage Entry of and claims priority to PCT/JP2011/052479 filed Feb. 7, 2011, and which is hereby incorporated by reference in its entirety for all purposes.

PCT/JP2011/052479 is an international counterpart to and claims priority from Japanese patent application 2010-165014 filed Jul. 22, 2010, and which is hereby incorporated by reference in its entirety for all purposes.

TECHNICAL FIELD

The present invention relates to a rolling bearing unit with an encoder for supporting a wheel of an automobile so as to be able to rotate freely with respect to the suspension, and for determining the rotational speed of that wheel. More specifically, the present invention relates to an improvement of a rolling bearing unit with encoder that comprises construction wherein a cover, which covers an opening on the inside end in the axial direction of an internal space where the encoder is located, is fitted inside and fastened to the inside end section in the axial direction of the outer ring.

BACKGROUND ART

Various construction for a rolling bearing unit with a rotational speed detector for supporting a wheel by the suspension of an automobile so as to be able to rotate freely, and for determining the rotational speed of that wheel has been known previously. In the case of any of the conventional construction, a detecting section of a sensor that is supported by and fastened to a non-rotating portion is made to face a detected surface of an encoder that is supported by and fastened to part of a hub that rotates together with the wheel. In this construction, the rotational speed of the wheel that rotates with the encoder is found based on the frequency or period of an output signal from the sensor that changes as the encoder rotates.

In order to protect the encoder of this kind of rolling bearing unit with a rotational speed detector from damage due to muddy water or dust adhering to the encoder, or, in order to prevent foreign matter such as magnetic powder from adhering to the encoder and damaging the reliability of the rotational speed detector that uses the encoder, construction such as disclosed in JP 4206550 (B2) and DE 19644744 (A1) of separating the encoder from the outside by a cover made of a non-magnetic plate is conventionally known. FIG. 11 illustrates an example of conventional construction as disclosed in JP 4206550 (B2). This conventional construction comprises a rolling bearing unit 2 with an encoder in which an encoder 1 is assembled, and a sensor 4 that is supported by and fastened to a knuckle 3 of the suspension.

In the rolling bearing unit 2 with encoder, the encoder 1 is supported by and fastened to the inside end section in the axial direction of the hub 6 of the rolling bearing unit 5 so as to be concentric with the hub 6. In addition to the hub 6, the rolling bearing unit 5 comprises an outer ring 7 and a plurality of rolling elements 8. The outer ring 7 has double rows of outer ring raceways 9 around the inner circumferential surface and a stationary flange 10 on the outer circumferential surface. During operation, the outer ring 7 is supported by the knuckle 3 and does not rotate.

The hub 6 comprises a main hub body 11, and an inner ring 12 that is connected and fastened to the main hub body 11 by a crimped section 13 that is formed on the inside end section in the axial direction of the main hub body 11; the hub 6 having double rows of inner ring raceways 14 around the outer circumferential surface thereof, and being supported on the inner-diameter side of the outer ring 7 so as to be concentric with the outer ring. Moreover, a rotating side flange 15 for supporting the wheel is provided on the outside end section in the axial direction of the main hub body 11 in the portion that protrudes further outward in the axial direction than the opening on the outside end in the axial direction of the outer ring 7. The rolling elements 8 are located between both outer ring raceways 9 and both inner ring raceways 14, with the rolling elements supported by a cage 16 in each row, so as to be able to roll freely. Furthermore, both end sections in the axial direction of the internal space 17 where the rolling elements 8 are located are covered by a seal ring 18 and a cover 19. In this specification, the "outside" in the axial direction is the side toward the outside in the width direction of the vehicle when assembled in the suspension. On the other hand, the "inside" in the axial direction is the side toward the center in the width direction of the vehicle when assembled in the suspension.

The cover 19 is formed using a non-magnetic metal plate such as an aluminum alloy plate, or austenitic stainless steel plate, or some other non-magnetic material. This kind of cover 19 comprises a cylindrical section 20 that extends in the axial direction, and a flat plate section 21 that is bent and extends inward in the radial direction from the inside end section in the axial direction of this cylindrical section 20. In the construction in FIG. 11, the rolling bearing unit 5 is applied to a non-driven wheel (rear wheel for a FF vehicle, front wheel for a FR vehicle or MR vehicle), so the flat plate section 21 is a circular plate shape that covers the entire opening on the inside end in the axial direction of the outer ring 7. On the other hand, in the case of a rolling bearing unit for a driven wheel (front wheel for a FF vehicle, rear wheel for a FR or MR vehicle, and any wheel for a 4WD vehicle), in the construction disclosed in DE 19644744 (A1), the flat plate section is ring shaped in order that the drive shaft can be inserted to the inner-diameter side of the cover. In either case, the cover 19 is such that the cylindrical section 20 fits inside the inside end section in the axial direction of the outer ring 7 with an interference fit, and is fastened to this inside end section in the axial direction of the outer ring 7.

The base end section of the encoder 1 is fitted onto a shoulder section 22 that is formed on the inside half in the axial direction of the inner ring 12, which corresponds to a portion toward the inside end of the hub 6, so that the encoder 1 is concentrically supported by and fastened to the hub 6. The encoder 1 comprises a support ring 23 that is formed into a circular ring shape with an L-shaped cross section by bending a magnetic metal plate such as low carbon steel plate, and a main encoder body 24 that is made using a permanent magnet such as a rubber magnet. This main encoder body 24 is magnetized in the axial direction, and by alternating the magnetization direction at uniform intervals in the circumferential direction, S poles and N poles are alternated at uniform intervals on the inside surface in the axial direction, which is the detected surface. The detected surface of this kind of main encoder body 24 is made to closely face through a small gap the outside surface in the axial direction of the flat plate section 21 of the cover 19 (surface on the internal space side). In other words, the cover 19 is pushed onto the inside end section in the axial direction of the outer ring 7 until the outside surface in the axial direction of the flat plate section 21 closely faces the detected surface of the main encoder body 24.

Furthermore, with the sensor 4 supported by and fastened to the knuckle 3, the detecting section of the sensor 4 is brought into contact with the inside surface (surface on the outer space side) in the axial direction of the flat plate section 21. In the state, the detecting section faces the detected surface of the main encoder body 24 by way of the flat plate section 21. In this state, as the main encoder body 24 rotates together with the hub 6, the S poles and N poles on the detected surface come by near the detecting section of the sensor 4 alternately, which causes the output of the sensor 4 to change. The frequency of this change is proportional to the rotational speed of the hub 6, and the period of this change is inversely proportional to the rotational speed, so based on either or both the frequency and period, the rotational speed of the wheel that is fastened to the hub 6 is found.

In the case of the conventional construction illustrated in FIG. 11, the permanent magnet main encoder body 24 and the external space are separated by the non-magnetic cover 19, so it is possible to prevent foreign matter such as magnetic powder from adhering to the detected surface of the main encoder body 24. As a result, this detected surface is maintained in a clean state, making it possible to maintain reliability of the rotational speed detector that uses this main encoder body 24. However, there is a need to improve the precision related to the distance between the detected surface of the main encoder body 24 and the detecting section of the sensor 4.

In other word, when the cylindrical section 20 is fitted inside the inside end section in the axial direction of the outer ring 7 with an interference fit in order for the cover 19 to be supported by and fastened to the outer ring 7, a force is applied in a direction inward in the radial direction to the flat plate section 21 that is on the inner-diameter side of the cylindrical section 20. Particularly, in the case of this conventional construction, the radius of curvature of a bent section that exists at the continuous section between the outer circumferential edge of the flat plate section 21 and the edge on the inside end in the axial direction of the cylindrical section 20 is small (in other words, bent with large curvature), and the portion that fits inside and is fastened to the outer ring 7 with an interference fit extends to nearly the outer circumferential edge of the flat plate section 21. Therefore, the force inward in the radial direction that is applied to the flat plate section 21 becomes considerably large, and due to this force the flat plate section 21 deforms in the direction of thickness (inward and outward in the axial direction) so as to curve.

The deformation direction and the amount of deformation cannot be regulated or predicted, so the position in the axial direction of the portion on the flat plate section 21 between the detected surface of the main encoder body 24 and the detecting section of the sensor 4 cannot be regulated with good precision. For example, when the sensor 4 is positioned by the detecting section of the sensor 4 coming in contact with the inside surface in the axial direction of the flat plate section 21 (surface on the external space side), that positioning become inaccurate when the flat plate section 21 is distorted. As a result, there is fluctuation in the density of the magnetic flux that reaches the detecting section of the sensor 4 from the detected surface of the main encoder body 24, which is disadvantageous from the aspect of maintaining the reliability of the rotational speed detection.

RELATED LITERATURE

Patent Literature

[Patent Literature 1] JP4206550(B2)
[Patent Literature 2] DE19644744(A1)

SUMMARY OF THE INVENTION

Problem to be Solved by the Invention

In consideration of the situation above, it is the object of the present invention to achieve construction that is capable of preventing deformation in the axial direction of the portion of the cover, which covers the opening on the inside end in the axial direction of the internal space where the encoder is located, further on the inner-diameter side than the portion that is fitted into and fastened to the inside end section in the axial direction of the outer ring, or in other words, the flat plate section of the cover that is bent and extends inward in the radial direction from the inside end section in the axial direction of the cylindrical section of the cover, when the cover is fitted into and fastened to the outer ring.

Means for Solving the Problems

The rolling bearing unit with an encoder for supporting a wheel of the present invention, similar to a conventional rolling bearing unit with an encoder for supporting a wheel has: an outer ring, a hub, a plurality of rolling elements, and an encoder and a cover.

The outer ring has double-row outer ring raceways around the inner circumferential surface thereof, and is supported by and fastened to a suspension during use so as not to rotate. The hub has double-row inner ring raceways around the outer circumferential surface thereof, and with a wheel supported by and fastened thereto during use, rotates together with the wheel. The rolling elements are provided such that there are a plurality of rolling elements located in each row between both outer ring raceways and both inner ring raceways. The encoder is supported by and fastened to the hub so as to be concentric with the hub, with the inside surface in the axial direction thereof being a detected surface having a magnetic characteristic that alternately changes in the circumferential direction.

Furthermore, the cover is made of a non-magnetic plate material, and comprises a cylinder section that extends in the axial direction, and a flat plate section that is bent and extends inward in the radial direction from the inside end section in the axial direction of the cylinder section. Together with this cylinder section fitting into the inside end section in the axial direction of the outer ring, the flat plate section closely faces the detected surface of the encoder.

Particularly, in the rolling bearing unit with an encoder for supporting a wheel of the present invention, a non-contact section is formed all the way around the inside end section in the axial direction of the cylinder section of the cover so as not to come in contact with the inner circumferential surface of the outer ring when the cover is fitted inside and fastened to the outer ring.

In other words, the non-contact section has an outer diameter that is smaller than the inner diameter of the inside end section in the axial direction of the outer ring. Moreover, the dimension in the axial direction of the non-contact section is two times or more, or preferably three times or more the thickness dimension of the plate member of the cover. When finding this value that is two times (three times) the value of the thickness, the value of the dimension in the axial direction of the non-contact section is the value of the distance between the position in the axial direction of the inside surface in the axial direction of the flat plate section of the cover and the position in the axial direction of the starting point of contact between the cylinder section of the cover and the outer ring in the state where the cylinder section of the cover is fitted inside and fastened to the inside end section in the axial direction of the outer ring with an interference fit and that cylinder section of the cover is elastically deformed.

By providing this kind of non-contact section, when the cover is fitted into the inside end section in the axial direction of the outer ring, the cylinder section is fitted into the inside end section in the axial direction of the outer ring so that only the portion further on the outside in the axial direction than the non-contact section fits inside with an interference fit.

When embodying the rolling bearing unit with an encoder for supporting a wheel of the present invention, the non-contact section is preferably formed into a partial conical cylindrical shape that is inclined in a direction such that the diameter becomes smaller going inward in the axial direction. Alternatively, the non-contact section is preferably composed of a small-diameter stepped section with a stepped section being located between the small-diameter stepped section and the portion near the outside in the axial direction.

When embodying the rolling bearing unit with an encoder for supporting a wheel of the present invention, preferably the inside end surface in the axial direction of the outer ring protrudes inward in the axial direction more than the inside end surface of the flat plate section. Furthermore, when embodying the rolling bearing unit with an encoder for supporting a wheel of the present invention, preferably a gap is formed between the detected surface of the encoder and the outside surface in the axial direction of the flat plate section of the cover that faces the detected surface of the encoder, and this gap is larger than a gap which is formed between the outside end surface in the axial direction of the cylinder section of the cover and an inside surface in the axial direction of a counterbore which is formed further near the inside end in the axial direction of the outer ring than the outer ring raceway and faces the outside end surface in the axial direction of the cylinder section of the cover. Alternatively, or additionally, it is preferred that the gap between the detected surface of the encoder and the outside surface in the axial direction of the flat plate section of the cover that faces the detected surface of the encoder be larger than a gap between the inside end surface in the axial direction of the hub and the outside surface in the axial direction of the cover that faces the inside end surface in the axial direction of the hub.

Effect of the Invention

As described above, with the rolling bearing unit with an encoder for supporting a wheel of the present invention, when a cover, which covers the opening on the inside end in the axial direction of the internal space where the encoder is located, is fitted and fastened in the inside of the inside end section in the axial direction of the outer ring, a force that is applied inward in the radial direction to the flat plate section of the cover is reduced by causing the non-contact section that exists between the fitted and fastened cylinder section and the flat plate section, so it is possible to suppress the transmission of that force to the flat plate section, and thus it is possible to prevent strain deformation in the axial direction of this flat plate section. Consequently, it is possible to regulate with good precision the position in the axial direction of the flat plate section that faces the detected surface of the encoder and the surface accuracy thereof including the perpendicularity and the like. As a result, when combined with a sensor for rotational speed detection, the density of the magnetic flux that leaves from the detected surface of the encoder and reaches the detecting section of the sensor can be sufficiently and surely maintained, and thus it is possible to maintain the reliability for detecting the rotational speed.

BRIEF DESCRIPTION OF THE DRAWINGS

FIG. 4A and FIG. 4B are similar to FIG. 2 and FIG. 3, where FIG. 4 is a variation of the first example and FIG. 4B is a variation of the second example, wherein the outer circumferential surface of the non-contact section is coated with a seal material.

MODES FOR CARRYING OUT THE INVENTION

Example 1

Figure 1:
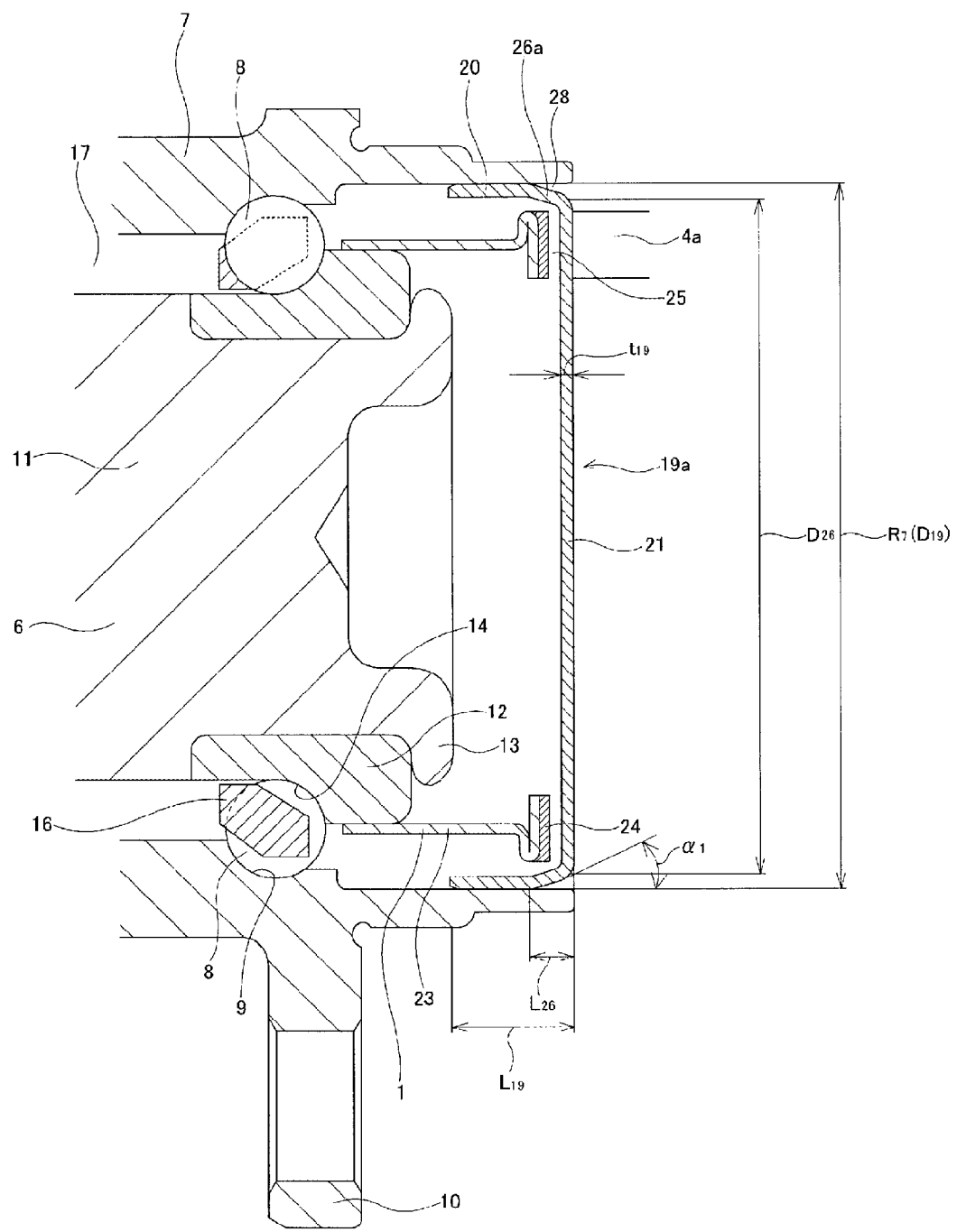
FIG. 1 is a partial cross-sectional view of a first example of an embodiment of the present invention.
Figure 2:
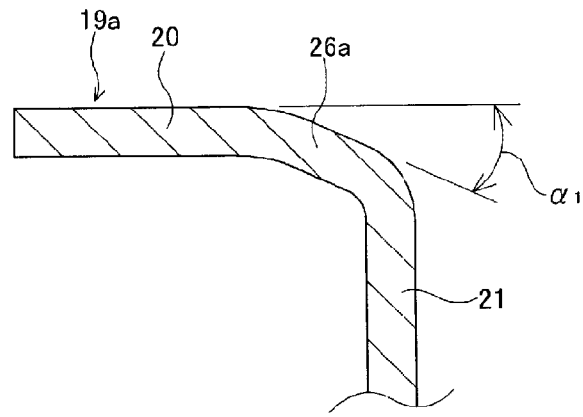
FIG. 2 is a partial enlarged cross-sectional view of the top part in FIG. 1, and illustrates the shape of a cover in the first example of an embodiment of the present invention.

FIG. 1 and FIG. 2 illustrate a first example of an embodiment of the present invention. A feature of the rolling bearing unit with an encoder for supporting a wheel of the present invention, including this example, is construction wherein as a cover 19a to 19d is fitted into and fastened to the inside end section in the axial direction of an outer ring 7 in order to cover the opening on the inside end in the axial direction of an internal space 17 where rolling elements 8 and an encoder 1 are located, deformation in the thickness direction (axial direction of the bearing unit that includes this cover) of side plate sections 21 of the cover 19a to 19d is suppressed. The construction and functions of other parts are the same as in the conventional rolling bearing unit with an encoder for supporting a wheel, so drawings and explanations of those parts are simplified or omitted, with the explanation below centering on the features of the present invention.

The cover 19a to 19d is made using a non-magnetic plate such as austenitic stainless steel plate such as SUS304, aluminum alloy plate, or synthetic resin plate, and comprises a cylindrical section 20 that extends in the axial direction on the outer circumference section of the cover 19a to 19d, and a flat plate section 21 on the inside end section in the axial direction that is bent and extends inward in the radial direction from the cylindrical section 20. The cylindrical section 20 is fitted into and fastened to the inside end section in the axial direction of the outer ring 7 with an interference fit. In this state, the outside surface in the axial direction of the flat plate section 21 (surface on the internal space side) is made to closely face through a minute gap 25 a detected surface (inside surface in the axial direction) of a main encoder body 24 of an encoder 1 that is fitted onto and fastened to a portion of a hub 6 near the inside end in the axial direction.

In the first example of an embodiment of the present invention, a non-contact section 26a is formed all the way around the inside end section in the axial direction of the cylindrical section 20 of the cover 19a. In this example, the non-contact section 26a has a partial conical cylindrical shape that is inclined in a direction such that the diameter becomes smaller going inward in the axial direction. Here, the non-contact section 26a means a portion of the cylindrical section 20 that does not come in contact with the inner circumferential surface of the outer ring 7 when the cylindrical section 20 of the cover 19a is fitted into and fastened to the inside end in the axial direction of the outer ring 7 with an interference fit and the cylindrical section 20 of the cover 19a elastically deforms. The end section on the small diameter side (inside end section in the axial direction) of this non-contact section 26a has an outer diameter $D_{26}$ smaller than the inner radius $R_7$ of the inside end section in the axial direction of the outer ring 7 ($R_7 > D_{26}$). Therefore, when the cover 19a is fitted into the inside end section in the axial direction of the outer ring 7, the inner circumferential surface of the outer ring 7 and the outer circumferential surface of the cylindrical section 20 of the cover 19a do not come in contact in the axial direction at the non-contact section 26a, without both circumferential surfaces pushed in the radial direction by each other. The portion of the cylindrical section 20 that is fitted into the inside end in the axial direction of the outer ring 7 with an interference fit is only the portion nearer to the outside in the axial direction than the non-contact section 26a.

Moreover, the dimension $L_{26}$ in the axial direction of the non-contact section 26a is two times or greater than the thickness $t_{19}$ of the plate material of the cover 19a ($L_{26} \geq 2t_{19}$), and preferably three times or greater ($L_{26} \geq 3t_{19}$). The flat plate section 21 is bend and extends inward in the radial direction from the end section on the small-diameter side (inside end section in the axial direction) of the non-contact section 26a. From the aspect of suppressing deformation of the flat plate section 21, the larger the dimension $L_{26}$ in the axial direction is, the more it is preferable. However, when the dimension $L_{26}$ in the axial direction is excessively large, the effect of suppressing deformation cannot increase any further, and the dimension in the axial direction of the interference fit that contributes to fastening the cover 19a to the outer ring 7 becomes short, which is disadvantageous from the aspect of maintaining the support strength of the cover 19a. Therefore, the dimension $L_{26}$ in the axial direction is 50% or less than the length in the axial direction of the cover 19a ($L_{26} \leq 0.5 L_{19}$), and preferably about 20% to 35%. In this example, when the cover 19a is fitted into and fastened to the inside end section in the axial direction of the outer ring 7, there is a possibility that part in the axial direction of the portion of the cylindrical section 20 that is a partial conical cylindrical shape in the free state will come in contact with the inner circumferential surface of the outer ring 7, so the dimension $L_{26}$ in the axial direction of the non-contact section 26a is determined as the value of the distance between the position in the axial direction of the inside surface in the axial direction of the flat plate section 21 of the cover 19a and the starting point of contact between the cylindrical section of the cover 19a and the outer ring 7 (starting point of the fit) when the cover 19a is fastened to the outer ring 7 and the outer circumference section of the cover 19a has elastically deformed, instead of the value measured in the free state.

From the aspect of preventing deformation due to the interference fit, in the relationship with the thickness $t_{19}$ of the cover 19a, it is realistic for the dimension $L_{26}$ to be about five times the thickness $t_{19}$ of the cover 19a ($L_{26} \leq 5 t_{19}$). When generally taking into consideration a good balance between the maintenance of the support strength of the cover 19a and the prevention of deformation, the most preferable is that the dimension $L_{26}$ in the axial direction be regulated to about three to four times the thickness $t_{19}$ of the cover 19a, or in other words $L_{26} = (3 \text{ to } 4) t_{19}$. However, for the reason of sufficiently being able to maintain the dimension $L_{20}$ in the axial direction of the cylindrical section 20, as long as it is possible to maintain the dimension in the axial direction of the fitting section even though the dimension $L_{26}$ in the axial direction is increased, it is possible for the dimension $L_{26}$ in the axial direction to even exceed five times the thickness $t_{19}$ of the cover 19a. However, increasing the dimension $L_{26}$ in the axial direction to greater than ten times the thickness $t_{19}$ of the cover 19a is unrealistic.

When fitting the cylindrical section 20 of the cover 19a into the inside end section in the axial direction of the outer ring 7, only the portion of the cylindrical section 20 that is nearer to the outside in the axial direction than the non-contact section 26a is fitted inside the outer ring with an interference fit. The portion of the cylindrical section 20 that is near the inside end in the axial direction and that is on the outer-diameter side of the flat plate section 21 is constructed by the non-contact section 26a, and when the cover 19a fitted inside and fastened to the inside end section in the axial direction of the outer ring 7, there is a gap 28 between the outer circumferential surface of the non-contact section 26a and the inner circumferential surface of the inside end section in the axial direction of the outer ring 7. Therefore, the outer circumferential surface of this non-contact section 26a is not pressed inward in the radial direction. In this example, the position in the axial direction of the inside end surface in the axial direction of the cover 19a (surface on the external space side) coincides with the position in the axial direction of the inside end surface of the outer ring 7, and the cover 19a does not protrude inward in the axial direction further than the outer ring 7.

The portion that is fitted into the inside end section in the axial direction of the outer ring 7, and that is located in the part of the cylindrical section 20 that is nearer the outside in the axial direction than the non-contact section 26a is strongly pressed inward in the radial direction. However, the non-contact section 26a exists all the way around between the portion in the axial direction that is fitted into the outer ring 7 with an interference fit and the flat plate section 21. Therefore, even when a strong force is applied inward in the radial direction to the portion that is fitted into the outer ring 7 with an interference fit, a large portion of that force is reduced by causing the non-contact section 26a that is located between the portion that is fitted into the outer ring 7 with an interference fit and the flat plate section 21 to deform, and is not reach the flat plate section 21. As a result, strain deformation in the axial direction of the flat plate section 21 that extends inward in the radial direction from the outer circumference section of the cover 19a is prevented, and the position in the axial direction of the flat plate section 21 that faces the detected surface (inside surface in the axial direction) of the main encoder body 24 of the encoder 1 can be regulated with good precision. Moreover, the squareness of this portion is also good. In other words, the shift in the portion on the inside surface in the axial direction of the flat plate section 21 that comes in contact with the detecting portion of the sensor 4a from a virtual plane that is orthogonal to the center axis can be kept to zero or very small.

As a result of being able to regulate the position in the axial direction of the portion of the flat plate section 21 that faces the detected surface of the encoder 1 and the surface precision of this section such as the perpendicularity, with good precision, it is possible, when the detecting section of the sensor 4a for detecting rotational speed is in contact with the inside surface in the axial direction of the flat plate section 21, to keep that posture of the sensor 4a and the position in the axial direction of the detecting section within the design values with good precision. Also, with the detecting section of the sensor 4a and the detected surface of the main encoder body 24 facing each other by way the flat plate section 21 (in a state with the encoder and the rotational speed detecting sensor assembled together), the density of the magnetic flux that reaches the detecting section of the sensor 4a from the detected surface of the main encoder body 24 is adequately and certainly maintained, and thus it is possible to maintain the reliability of the rotational speed detection.

Moreover, the inclination angle $\alpha_1$ of the generating line of the non-contact section 26a with respect to the center axis is preferably 10° to 45°, and more preferably 10° to 35°, and even more preferably 15° to 25°. The closer the inclination angle $\alpha_1$ is to the most preferable range of 15° to 25°, the effect of preventing strain deformation in the axial direction of the flat plate section 21 that exists in the portion of near the inner diameter of the cover 19a. Moreover, by making the inclination angle $\alpha_1$ 45° or less, the occurrence of shear drop in the curved section between the cylindrical section 20 and the flat plate section 21 during processing is suppressed, and thus variation in the starting point in the axial direction of the fitting section, and the occurrence of peak fitting surface pressure due to the occurrence of shear drop are also suppressed. Taking into consideration stability when pressure fitting the cover 19a onto the outer ring 7, it is preferable that the inclination angle $\alpha_1$ be a smaller value within the range above.

Preferably the outer-diameter dimension $D_{21}$ of the main encoder body 24 is less than the value that is obtained when the outer diameter $D_{26}$ of the end section on the small-diameter side of the non-contact section 26a (inside end section in the axial direction) is reduced by two times the plate thickness $t_{19}$ of the cover 19a ($D_{24}<D_{26}-2t_{19}$). In other words, preferably, contact in the radial direction between the portion of the inner circumferential surface of the non-contact section 26a and the outer circumferential edge of the main encoder body 24 is prevented by regulating the dimensions in the radial direction of each part in this way. More preferably, the outer diameter $D_{24}$ of the main encoder body 24 is less than a value obtained when the outer diameter $D_{26}$ of the end section on the small-diameter side of the non-contact section 26a is reduced by three times the plate thickness $t_{19}$ of the cover 19a ($D_{24}<D_{26}-3t_{19}$).

Example 2

Figure 3:
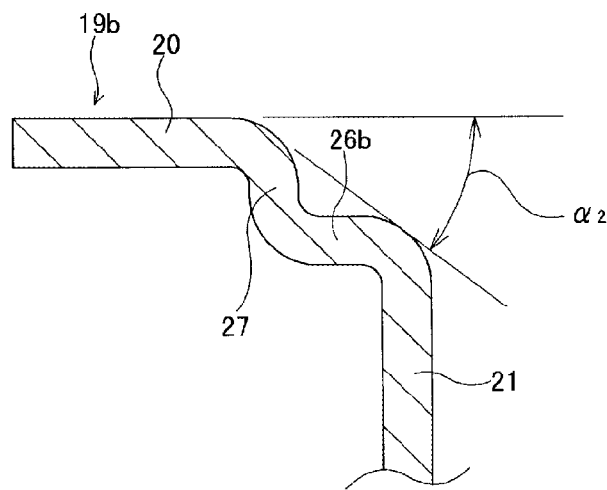
FIG. 3 is a partial enlarged cross-sectional view of the top part in FIG. 1, and illustrates the shape of a cover in a second example of an embodiment of the present invention.

FIG. 3 illustrates a second example of an embodiment of the present invention. This second example of an embodiment of the present invention differs from the first example in that the non-contact section 26b is constructed by a small-diameter step section with a stepped section 27 located between it and the portion near the outside in the axial direction. In this case as well, the non-contact section 26b (cylindrical portion further on the inside than the stepped section 27) has an outer diameter $D_{26}$ that is less than the inner radius $R_7$ of the inside end section in the axial direction of the outer ring 7 ($R_7>D_{26}$), so with the cylindrical section 20 of the cover 19b fitted into the inside end section in the axial direction of the outer ring 7, there is not contact between the inner circumferential surface of the outer ring 7 and the outer circumferential surface of the non-contact section 26b. In this example as well, the dimension $L_{26}$ in the axial direction of the non-contact section 26b is preferably two times or greater ($L_{26} \geq 2t_{19}$) and five times or less ($L_{26} \leq 5t_{19}$) than the thickness dimension $t_{19}$ of the plate material of the cover 19b, and more preferably, $L_{26}=(3$ to $4) \times t_{19}$. Moreover, this dimension $L_{26}$ in the axial direction is 50% or less than the length $L_{19}$ in the axial direction of the cover 19b ($L_{26} \leq 0.5 L_{19}$), and is preferably 20% to 35% the length $L_{19}$. The stepped section 27 is formed, after the partial conical cylindrical section shown in the first example is formed, with the rounded surface section on the inner-diameter side and the tapered surface on the outer-diameter side between the partial conical cylindrical section and the cylinder section 20 held, and with the rounded surface section on the inner-diameter side between the partial conical cylindrical section and the flat plate section 21 supported, by applying a punch from the inside of the axial direction toward the partial conical cylindrical section. Therefore, as in the first example, the occurrence of shear drop on the cylindrical section side is suppressed. Furthermore, preferably the inclination angle $\alpha_2$ of the common tangent line of the two rounded surface sections on the outer-diameter side of the non-contact section 26b with respect to the center axis is 10° to 45°, and more preferably 10° to 35°, and even more preferably, 15° to 25°. With the construction of this second example, the same function and effects as in the first example are obtained.

Figure 4:
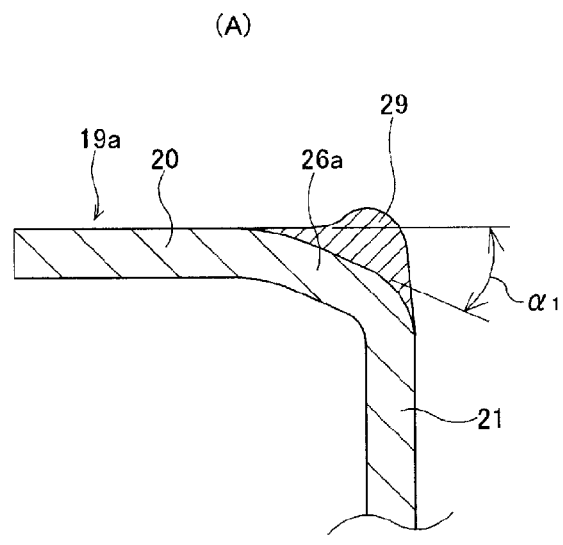
Figure 4:
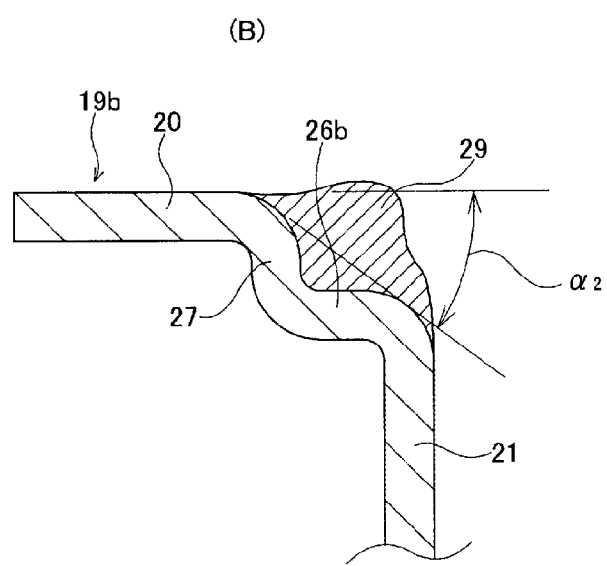

In the rolling bearing unit with an encoder for supporting a wheel of this present invention, including the first and second examples, a non-contact section 26a, 26b that is provided for preventing straining of the flat plate section 21, can be used to improve the seal performance of the installation section of the cover 19a, 19b. In other words, as illustrated in FIGS. 4A and 4B, it is possible to fill a sealing material 29 that is made using an elastic material that includes an elastomer such as rubber or vinyl on the outer circumferential surface of the non-contact section 26a, 26b so as to cover the non-contact section 26a, 26b with this sealing material 29. The outer diameter of this sealing material 29 in the free state is greater than the inner diameter of the inside end section in the axial direction of the outer ring 7. By holding this kind of sealing material 29 in an elastically compressed state in the radial direction around the entire circumference between the outer circumferential surface of the non-contact section 26a, 26b and the inner circumferential surface of the inside end section in the axial direction of the outer ring 7, it is possible to improve the seal performance of the installation section. As this sealing material 29 is elastically compressed, the force that applies inward in the radial direction to the flat plate section 21 is limited, and by providing this sealing material 29, harmful warping or strain does not occur in the flat plate section 21.

The seal of the installation section can also be maintained by filling of the non-contact section 26a, 26b with sealant (caulking agent) such as a gel instead of the seal material 29 having elasticity as described above. In that case, after the cylindrical section 20 of the cover 19a, 19b has been fitted into and fastened to the inside end section in the axial direction of the outer ring 7, the sealant is filled into the gap 28. Moreover, after the outer circumferential surface of the cylindrical section 20 has been coated with sealant, it is possible to fit this cylindrical section 20 inside the outer ring 7. Furthermore, it is also possible to maintain the seal of the installation section by coating the surface of the cover 19a, 19b, including the outer circumferential surface of the cylindrical section 20, with a coating film made of a resin paint using electro deposition, and holding that film between the outer circumferential surface of the cylindrical section 20 and the inner circumferential surface of the inside end section in the axial direction of the outer ring 7.

Example 3

Figure 5:
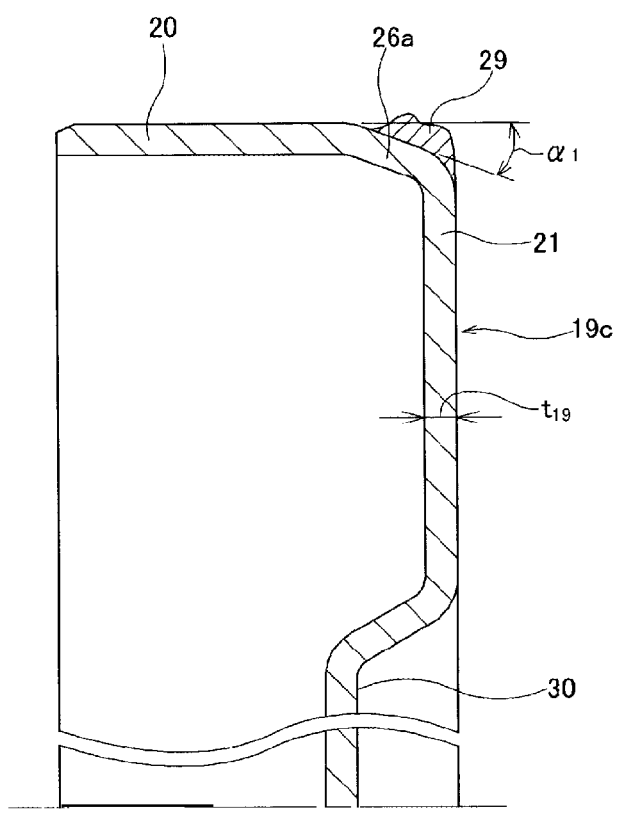
FIG. 5 is a partial enlarged cross-sectional view illustrating a third example of an embodiment of the present invention.

FIG. 5 illustrates a third example of an embodiment of the present invention. In this example, a concave section 30 is formed in the center section in the radial direction of the cover 19c. More specifically, the portion further on the inside in the radial direction than the flat plate section 21 of the cover 19c is caused to protrude to the outside in the axial direction (internal space side). The detected surface of the main encoder body 24 faces the outside surface in the axial direction of the flat plate section 21 (surface on the internal space side). By providing this kind of concave section 30, the rigidity of the flat plate section 21 is improved, and it becomes possible to make the flat plate section 21 a more precise and better flat surface. In this case as well, the inclination angle $\alpha_1$ of the non-contact section is preferably 5° to 45°, and more preferably 10° to 35°, and most preferably 15° to 25°. As a result, it becomes possible to fit and fasten the cover 19c into the inside end section in the axial direction of the outer ring 7, while better maintaining the flatness precision of the flat plate section 21. The inner diameter of the flat plate section 21 is taken to be 25% or more the diameter $D_{19}$ of the cover 19c, and it is set within a range such that the concave section 30 does not come in contact with the main encoder body 24 or the like. Moreover, in consideration of the ease of processing and the anti-deformation effect, the angle of the tapered surface of the concave section 30 protruded from the flat plate section 21 to the outside in the axial direction is regulated within the range 5° to 90°, and preferably 20° to 70°.

Example 4

Figure 6:
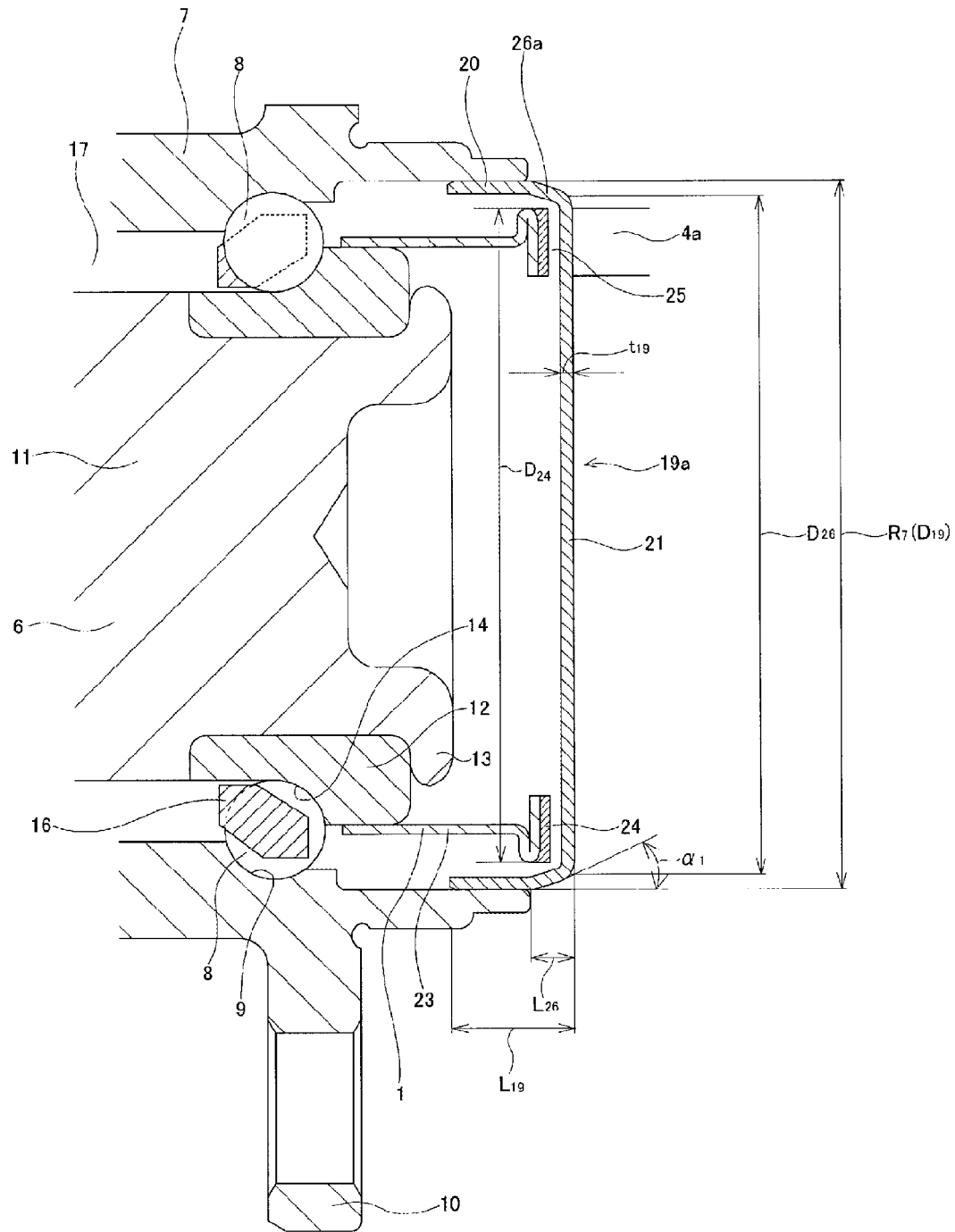
FIG. 6 is a partial enlarged cross-sectional view illustrating a fourth example of an embodiment of the present invention.

FIG. 6 illustrates a fourth example of an embodiment of the present invention. In the case of the fourth example illustrated in FIG. 6, the length in the axial direction on the inside end section in the axial direction of the outer ring 7 from the inside surface in the axial direction of the stationary side flange 10, is shorter than in the construction in the first example illustrated in FIG. 1. In other words, in this example, the width of the inside end section in the axial direction of the outer ring 7 is shortened, and this outer ring 7 does not exist on the outside in the radial direction of the non-contact section 26a of the cover 19a. In the case of the construction of this example, the wedge shaped gap 28 (see FIG. 1) that is formed between the outer circumferential surface of the non-contact section 26a of the cover 19a and the inner circumferential surface of the inside end section of the outer ring 7 is eliminated. Therefore, it is possible to prevent foreign matter such as water being held in the portion of this gap 28 even when there is no seal material 29 such as illustrated in the variation (see FIG. 4) of the first and second examples, and thus it is possible to prevent foreign matter such as water from getting inside the rolling bearing unit, and to prevent rusting from occurring. It is also possible to use seal material together with this construction. In that case, the seal material elastically comes in contact around the entire circumference of the surface of part of the outer ring 7, such as the inside end surface in the axial direction of the outer ring 7.

Example 5

Figure 7:
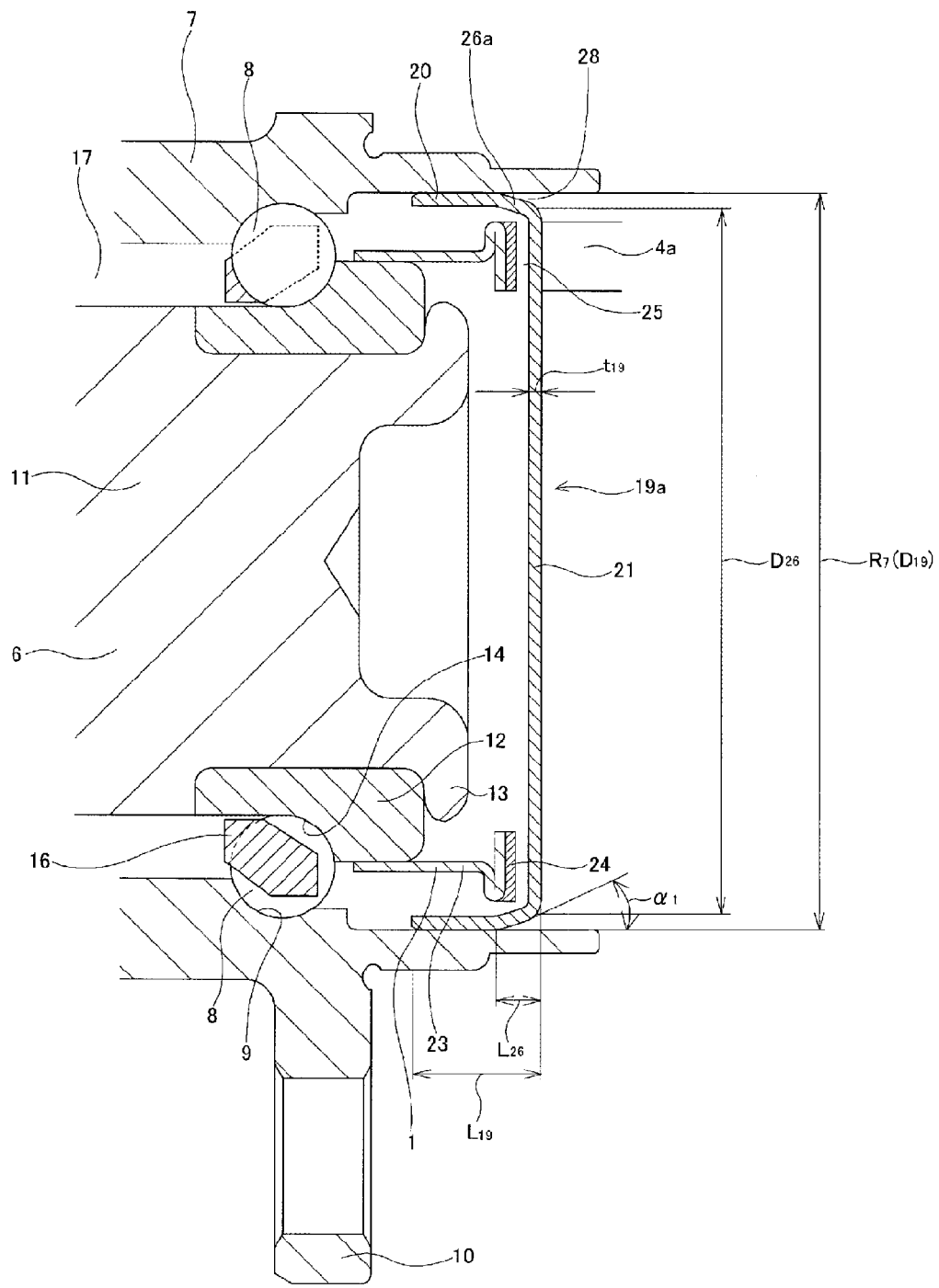
FIG. 7 is a partial enlarged cross-sectional view illustrating a fifth example of an embodiment of the present invention.

FIG. 7 illustrates a fifth example of an embodiment of the present invention. In the case of this fifth example illustrated in FIG. 7, the length in the axial direction on the inside end section in the axial direction of the outer ring 7 from the inside surface in the axial direction of the stationary side flange 10 is longer than in the construction of the first example illustrated in FIG. 1. In other words, in this example, the width of the inside end section in the axial direction of the outer ring 7 is extended and protrudes further inward in the axial direction than the flat surface section 21 of the cover 19a. In the case of the construction of this example, the inside end section in the axial direction of the outer ring 7 that protrudes inward in the axial direction serves the function of protecting the cover 19a, and makes it possible to prevent pressing the cover 19a by mistake during assembly, or deformation of the cover 19a due to hit by flying stones and the like when the vehicle is traveling. Furthermore, because the sensor 4a is also covered by the protruding end section in the axial direction of the outer ring 7, the sensor 4a can be protected from dust, incoming stones and the like. The construction of this example as well can easily be used together with seal material, in which case the seal material elastically comes in contact all the way around the outer circumferential surface of the inside end section in the axial direction of the outer ring 7.

Example 6

Figure 8:
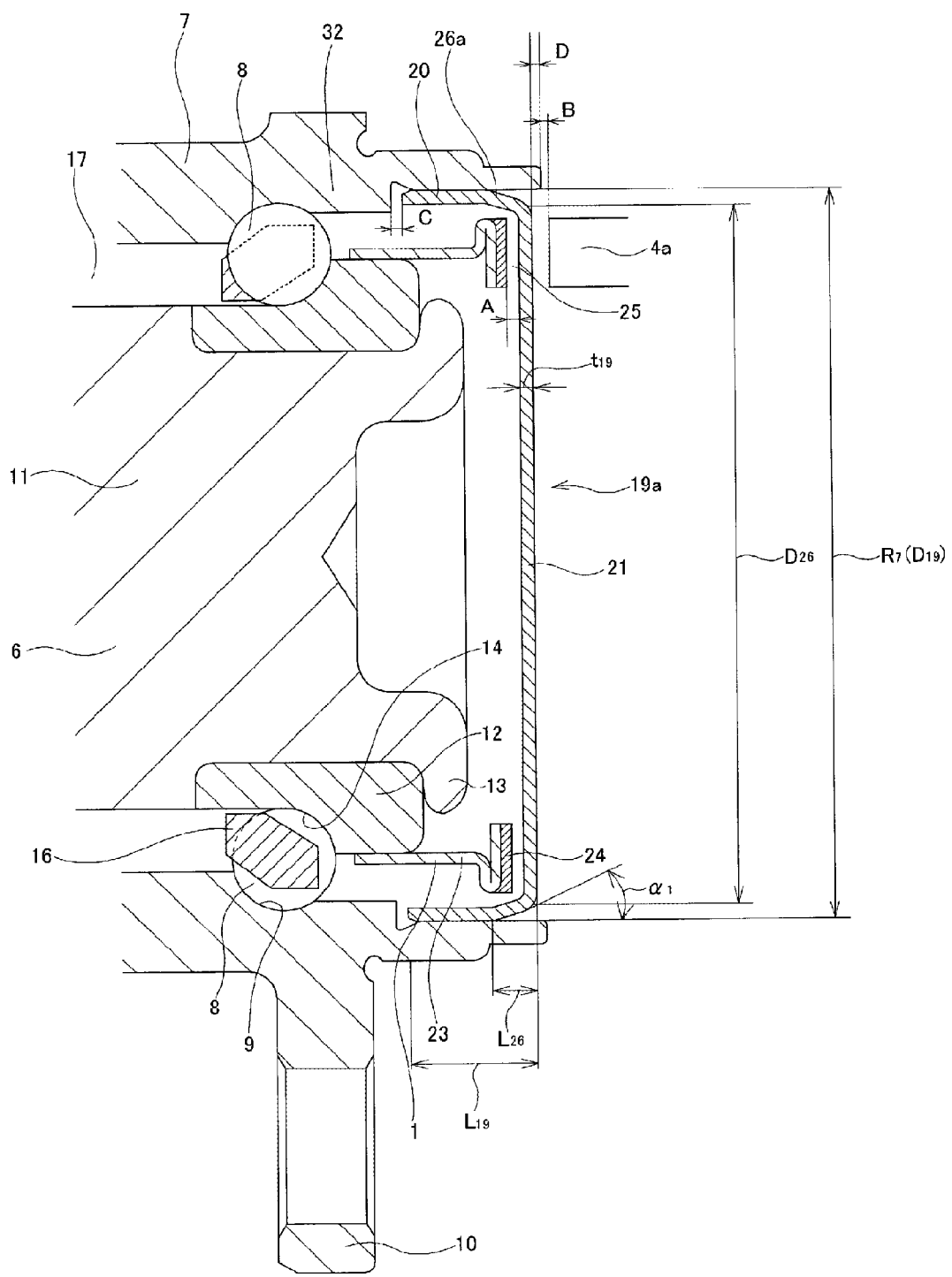
FIG. 8 is a partial enlarged cross-sectional view illustrating a sixth example of an embodiment of the present invention.

FIG. 8 illustrates a sixth example of an embodiment of the present invention. In the case of this sixth example illustrated in FIG. 8, the length in the axial direction on the inside end section of the outer ring 7 from the inside surface in the axial direction of the stationary side flange 10 is a little longer than in the construction of the first example illustrated in FIG. 1. In other words, in this example, the width of the inside end section in the axial direction of the outer ring 7 is extended a little, and protrudes just an amount D inward in the axial direction more than the flat surface section 21 of the cover 19a. Moreover, with the outside end section in the axial direction of the cylindrical section 20 facing the counterbore 32 of the outer ring raceway 9 with a gap C remaining, the cylindrical section 20 is fitted into and fastened to the inside end section in the axial direction of the outer ring 7. Here, the outside surface (surface on the internal space side) in the axial direction of the flat plate section 21 and the detected surface of the main encoder body 24 closely face each other through a gap A, and there is a minute gap 25. On the other hand, with the detecting surface of the sensor 4a located inward in the axial direction by a gap B with respect to the inside end in the axial direction of the outer ring 7, the sensor 4a is supported by and fastened to the knuckle (not illustrated in the figure).

In the case of the construction of this example, gap A is set to be larger than gap C (A>C). As a result, even when the cover 19a may be pressed outward in the axial direction, the cover 19a does not come in contact with the main encoder body 24. Furthermore, by having a gap B and protruding amount D (B>0, D>0), there is a gap (B+D) between opposing flat plate section 21 and detecting surface of the sensor 4a. Therefore, even when the flat plate section 21 may vibrate or bulge due to a rise in internal bearing pressure, the cover 19a and the sensor 4a do not come in contact with each other, so it is possible to prevent fretting wear of the detecting surface of the sensor 4a, and damage to the sensor element due to that wear. The construction of this example can also easily be used together with a seal material, and in that case the seal material elastically comes in contact around the entire inner circumferential surface of the inside end section in the axial direction of the outer ring 7. In the case of use in a compact automobile, the gap A can be regulated to 0.5±0.1 mm, gap B can be regulated to 0.1±0.1 mm, gap C can be regulated to 0.25±0.25 mm, gap D can be regulated to 0.1±0.1 mm, and the gap (B+D) between the sensor 4a and the flat plate section 21 can be regulated to 0.2±0.2 mm, however the dimensions are not limited to this.

Example 7

Figure 9:
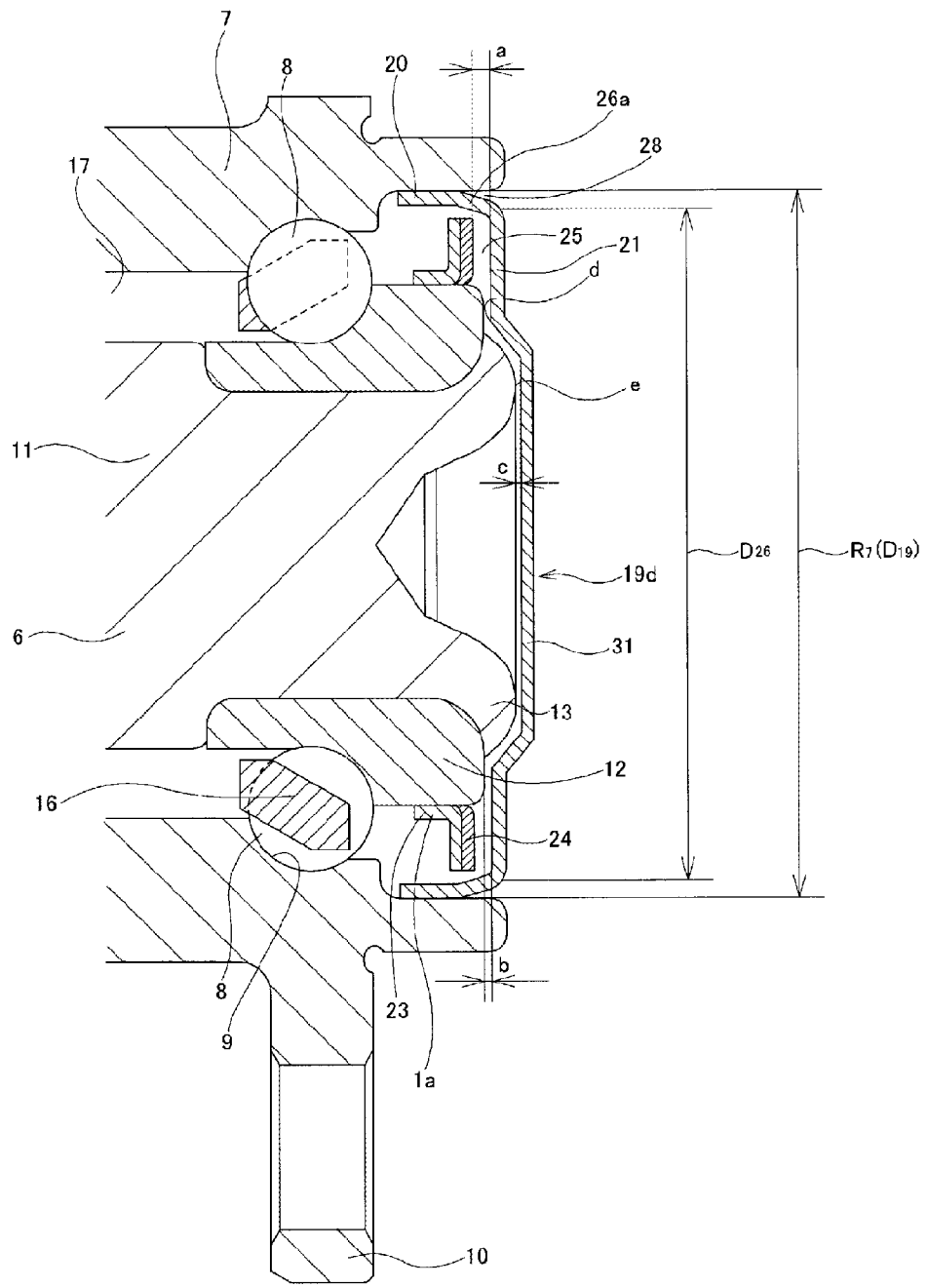
FIG. 9 is a partial enlarged cross-sectional view illustrating a seventh example of an embodiment of the present invention.
Figure 10:
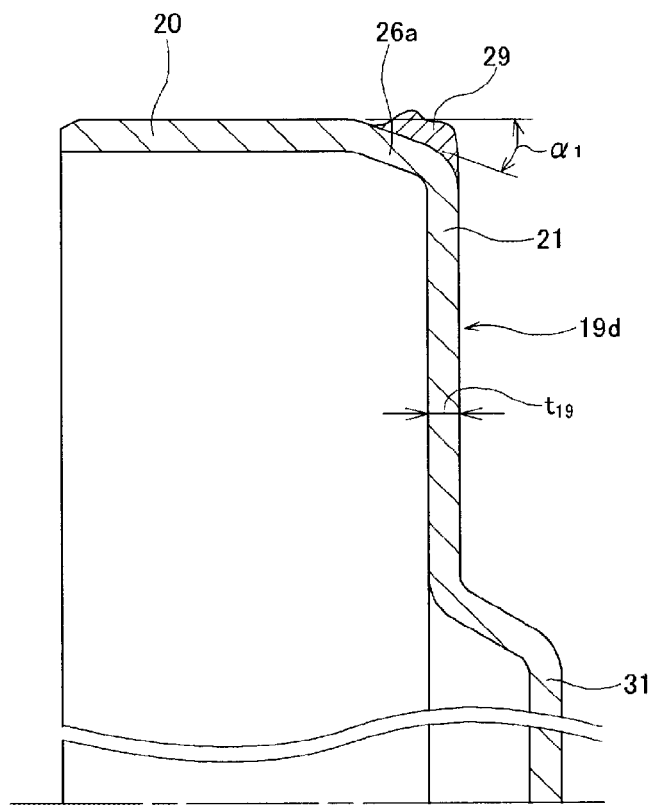
FIG. 10 is a partial enlarged cross-sectional view illustrating a variation of the seventh example, wherein the outer circumferential surface of the non-contact section is coated with a seal material.
Figure 11:
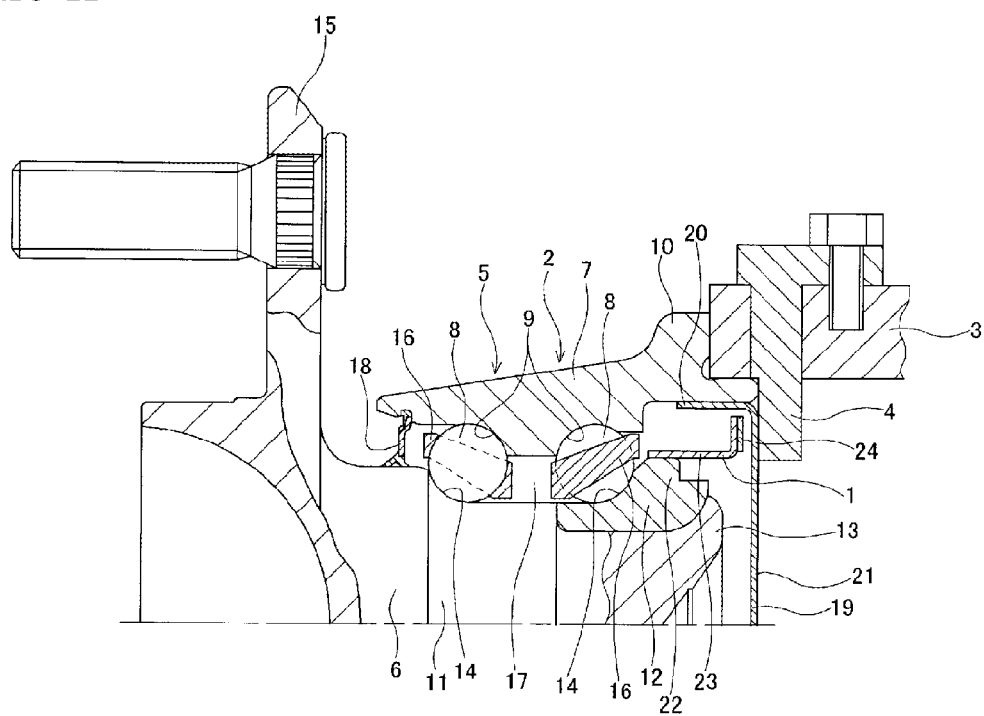
FIG. 11 is a partial cross-sectional view illustrating an example of conventional construction.

FIG. 9 and FIG. 10 illustrate a seventh example of an embodiment of the present invention. In the seventh example illustrated in FIG. 9, the construction differs from the construction of the first example illustrated in FIG. 1 in that the main encoder body 24 of the encoder 1a is attached to the inside surface in the axial direction of the circular ring section of a support ring 23 that has an L-shaped cross section and an overall ring shape, however, the length in the axial direction of the support ring 23 is small, and an inner ring 12 of the hub 6 and a crimped section 13 of the main hub body 11 protrude further inward in the axial direction than the detected surface (inside surface in the axial direction) of the main encoder body 24. In this example, a convex section 31 is formed in the center section in the radial direction of the cover 19d. More specifically, the portion on the inside in the radial direction is made to protrude further to the inside in the axial direction (external space side) than the flat plate section of the cover 19d. The detected surface of the main encoder body 24 faces the outside surface in the axial direction of the flat plate section 21 (surface on the internal space side). By providing this kind of convex section 31, as in the third example of the embodiment, it becomes possible to improve the rigidity of the flat plate section 21 and make the flat plate section 21 a flat surface having better accuracy. The inner diameter of the flat plate section 21 is taken to be 25% or greater than the diameter $D_{19}$ of the cover 19d. Moreover, taking into consideration the each of processing and the anti-deformation effect, the angle of the tapered surface that protrudes from the flat plate section of the convex section 31 to the inside in the axial direction is regulated to the range of 5° to 90°, and preferably is regulated to the range of 20° to 70°.

In this example, the minute gap 25 (gap "a") between the outside surface in the axial direction of the flat plate section 21 of the cover 19d (surface on the internal space side) and the opposing detected surface of the main encoder body 24 (inside surface in the axial direction) is set to be greater than the gap "b" between the outside surface in the axial direction of the flat plate section 21 and the inside surface in the axial direction of the opposing inner ring 12 (a>b). As a result, even in the case where the cover 19d is pressed outward in the axial direction, the cover 19d comes in contact at the portion (point d) of the flat plate section 21 of the cover 19d that is the closest to the surface on the inside end in the axial direction of the inner ring 12, so the cover 19d does not come in contact with the main encoder body 24. Moreover, in this example, the minute gap 25 (gap "a") is set to be greater than the gap "c" between the outside surface in the axial direction of the convex section 31 of the cover 19d and the surface on the inside end in the axial direction of the crimped section 13 of the closely opposing main hub body 11 (a>c). As a result, even in the case where the cover 19d is pressed outward in the axial direction, the cover 19d comes in contact at the portion (point "e") that is closest to the surface on the inside end in the axial direction of the crimped section 13 of the convex section 31 of the cover 19d, so the cover 19d does not come in contact with the main encoder body 24. Taking into consideration the change in the relative inclination or displacement of the outer and inner rings when a moment load is applied to the bearing due to the reaction force of the road surface, and the precision of the location of the pressure fit based on the outer ring 7 when the encoder 1a and the cover 19d is pressure fitted with the outer ring 7, the minimum value of the gap "a" is regulated so that the main encoder body 24 and the cover 19d do not come in contact.

In this example, gap "b" is set to be greater than gap "c" (b>c). When the bearing is stationary, the effect of contact at point "d" and contact at point "e" is the same, however, when the bearing is rotating, contact at point "e" where the circumferential speed is lower is more preferable. Therefore, in the present invention, the relationship of the sizes of these gaps is regulated such that a>b>c, and is regulated such that when the cover 19d is pressed outward in the axial direction, contact is first made at point "e". The construction of this example can also be easily used together with a seal material, and in that case, the seal material elastically comes in contact all around the inner circumferential surface of the inside end section in the axial direction of the outer ring 7 (see FIG. 10).

A characteristic of this example is that the amount that the flat plate section 21 moves in the axial direction when the cover 19d is pressed is regulated by a gap in the axial direction that exists between the cover 19d and the inside end surface in the axial direction of the hub 6 (crimped section 13 of the main hub body 11, or the inner ring 12). Therefore, by providing gaps with the relationship (a>b, or a>c), an effect of avoiding contact between the cover 19d and the main encoder body 24 is obtained. As a result, in the case of an encoder 1a for which it is difficult to determine possible problems due to the existence of the cover 19d, it is possible to prevent a state in which the position of the encoder 1a moves due to contact with the cover 19d and many electromagnetic signal errors occur. Moreover, due to the effect of preventing this kind of contact, it is possible for the cover and bearing to be closer than before, so it is possible to make the hub bearing compact.

The present invention can be applied either to the case of the entire surface of the flat plate section having a circular plate shape and extending in the radial direction to the center section as in the first, second, fourth, fifth and sixth examples, to the case of the cover having a concave section 30 formed in the center section as in the third example, or to the case of the cover having a convex section 32 formed in the center section as in the seventh example. Furthermore, the present invention can also be applied to a case as disclosed in DE 19644744 (A1) where the cover has a circular ring shape with a large circular hole in the center section for constructing a rolling bearing unit with encoder for a drive wheel. Moreover, as far as applicable, the characteristics of the examples can be applied to other examples. For example, the construction of forming a concave section in the center section of the third example, or the construction of forming a convex section in the center section of the seventh example can be used instead of construction comprising only the flat plate section above. In addition, it is also possible to replace the construction of third and seventh examples by the construction having only the flat plate section. Furthermore, it is possible to apply the relationship between the outer ring and the cover of the first, fourth and fifth examples to other examples, and to apply the regulation of gaps described in the sixth and seventh examples to other examples.

Experimental Example

An example of a test that was performed in order to confirm the effect of the present invention will be explained. In the test, the cover 19c of the third example illustrated in FIG. 5 was used. The cover 19c was manufactured using SUS304 stainless steel material having a thickness dimension of $t_{19}$ of 0.6 mm. The outer diameter $D_{19}$ of this cover 19c was 57 mm, the length $L_{19}$ in the axial direction was 7.8 mm, and the value of the interference (absolute value of the difference between the inner diameter of the inside end section in the axial direction of the outer ring 7 and the outer diameter $D_{19}$ of the cover 19c) was 0.18 mm (180 μm).

In this cover 19c, a partial conical convex surface section having a dimension in the axial direction of 2.2 mm and an inclination angle of about 20° was formed. The cylindrical section 20 of this cover 19c was fitted into the inside end section in the axial direction of the outer ring 7. In this state, as a specified position near the outer diameter of the flat place section was 0, the amount of transformation, which was the amount of expansion or depression, of the portion of the flat plate section 21 that faces the detected surface of the main encoder body 24 was measured using a dial gage, and as a result the maximum value of deformation at this portion was 0.064 mm (64 μm). After that, the cover 19c was removed from the outer ring 7 and the position of contact marks was checked, and when the dimension $L_{26a}$ in the axial direction of the non-contact section was checked, the contact mark was a little less than 2.2 mm, however two times or more (actually three times) the plate thickness (0.6 mm) sufficiently remained.

As a comparison, a cover 19 having conventional construction was manufactured under the same conditions at this example except that a non-contact section was not provided, and the continuous section between the cylindrical section 20 and the flat plate section 21 was continuous at a bent section having a large curvature (the radius of curvature on the outer diameter side in the free state before fitting inside the inside end section in the axial direction of the outer ring 7 was a small 1.2 mm), and the cylindrical section of this cover 19 was fitted into the inside end section in the axial direction of the outer ring 7 that was the same as in the above experimental example. Upon performing the same measurements, the portion of the flat plate section 21 that faces the detected surface of the main encoder body 24 deformed in the axial direction with the maximum value of 0.144 mm (144 μm). In other words, with the present invention, the amount of deformation of the flat plate section of the cover, and particularly, the portion of this flat plate section that faces near the main encoder body could be suppressed by about 45% that of the conventional part, and through this example, the effect of the present invention was confirmed.

INDUSTRIAL APPLICABILITY

The rolling bearing unit with encoder for supporting a drive wheel can be suitably applied to rotational support of a wheel.

EXPLANATION OF REFERENCE NUMBERS 1, 1a Encoder
2 Rolling bearing unit with encoder
3 Knuckle
4, 4a Sensor
5 Rolling bearing unit
6 Hub
7 Outer ring
8 Rolling element
9 Outer ring raceway
10 Stationary side flange
11 Main hub body
12 Inner ring
13 Crimped section
14 Inner ring raceway
15 Rotating side flange
16 Cage
17 Internal space
18 Seal ring
19, 19a, 19b, 19c, 19d Cover
20 Cylindrical section
21 Flat plate section
22 Shoulder section
23 Support ring
24 Main encoder body
25 Minute gap
26a, 26b Non-contact section
27 Stepped section
28 Gap
29 Seal material
30 Concave section
31 Convex section
32 Counterbore

What is claimed is:

1. A rolling bearing unit with an encoder for supporting a wheel, comprising;
an outer ring having double-row outer ring raceways around the inner circumferential surface thereof, and that is supported by and fastened to a suspension during use so as not to rotate;
a hub having double-row inner ring raceways around the outer circumferential surface thereof, and with the wheel supported by and fastened thereto during use, rotates together with the wheel;
rolling elements that are provided such that there are a plurality of rolling elements located in each row between the outer ring raceways and the inner ring raceways;
the encoder that is supported by and fastened to the hub so as to be concentric with the hub, with the inside surface in the axial direction thereof being a detected surface having a magnetic characteristic that alternately changes in the circumferential direction; and
a cover that is made of a non-magnetic plate material, and that comprises a cylinder section that extends in the axial direction, and a flat plate section that is bent and extends inward in the radial direction from the inside end section in the axial direction of the cylinder section, and together with this cylinder section fitting into the inside end section in the axial direction of the outer ring, the flat plate section closely facing the detected surface of the encoder;
wherein a non-contact section is formed all the way around the inside end section in the axial direction of the cylinder section of the cover so as not to come in contact with the inner circumferential surface of the outer ring when the cover is fitted inside and fastened to the outer ring, and with the cover fitted into the inside end section in the axial direction of the outer ring, the cylinder section is fitted into the inside end section in the axial direction of the outer ring so that only the portion closer to the outside in the axial direction than the non-contact section fits inside with an interference fit,
wherein the non-contact section is formed into a partial conical cylindrical shape that is inclined in a direction such that the diameter becomes smaller going inward in the axial direction, and
wherein an inclination angle of a generating line of the non-contact section with respect to a center axis of the rolling bearing unit is 15 degrees to 25 degrees.

2. The rolling bearing unit with the encoder for supporting the wheel according to claim 1, wherein a sealing material is filled on the circumferential surface of the non-contact section so as to cover the non-contact section with the sealing material.

3. The rolling bearing unit with the encoder for supporting the wheel according to claim 1, wherein the inside end surface in the axial direction of the outer ring protrudes inward in the axial direction more than the inside end surface of the flat plate section.

4. The rolling bearing unit with the encoder for supporting the wheel according to claim 1, wherein the flat plate section protrudes inward in the axial direction more than the inside end surface in the axial direction of the outer ring.

5. The rolling bearing unit with the encoder for supporting the wheel according to claim 1, wherein a concave section is formed in a center section in the radial direction of the cover such that the concave section protrudes to the outside in the axial direction from the flat plate section, or a convex section is formed in a center section in the radial direction of the cover such that the convex section protrudes to the inside in the axial direction from the flat plate section.

6. A rolling bearing unit with an encoder for supporting a wheel, comprising:
    an outer ring having double-row outer ring raceways around the inner circumferential surface thereof, and that is supported by and fastened to a suspension during use so as not to rotate;
    a hub having double-row inner ring raceways around the outer circumferential surface thereof, and with the wheel supported by and fastened thereto during use, rotates together with the wheel;
    rolling elements that are provided such that there are a plurality of rolling elements located in each row between the outer ring raceways and the inner ring raceways;
    the encoder that is supported by and fastened to the hub so as to be concentric with the hub, with the inside surface in the axial direction thereof being a detected surface having a magnetic characteristic that alternately changes in the circumferential direction; and
    a cover that is made of a non-magnetic plate material, and that comprises a cylinder section that extends in the axial direction, and a flat plate section that is bent and extends inward in the radial direction from the inside end section in the axial direction of the cylinder section, and together with this cylinder section fitting into the inside end section in the axial direction of the outer ring, the flat plate section closely facing the detected surface of the encoder;
    wherein a non-contact section is formed all the way around the inside end section in the axial direction of the cylinder section of the cover so as not to come in contact with the inner circumferential surface of the outer ring when the cover is fitted inside and fastened to the outer ring, and with the cover fitted into the inside end section in the axial direction of the outer ring, the cylinder section is fitted into the inside end section in the axial direction of the outer ring so that only the portion closer to the outside in the axial direction than the non-contact section fits inside with an interference fit,
    wherein the non-contact section is constructed by a small-diameter stepped section with a stepped section being located between the small-diameter stepped section and the portion near the outside in the axial direction, and
    wherein an inclination angle of a common tangent line of the non-contact section with respect to a center axis of the rolling bearing unit is 15 degrees to 25 degrees.

7. The rolling bearing unit with the encoder for supporting the wheel according to claim 6, wherein a sealing material is filled on the circumferential surface of the non-contact section so as to cover the non-contact section with the sealing material.

8. The rolling bearing unit with the encoder for supporting the wheel according to claim 2, wherein the inside end surface in the axial direction of the outer ring protrudes inward in the axial direction more than the inside end surface of the flat plate section.

9. The rolling bearing unit with the encoder for supporting the wheel according to claim 6, wherein the flat plate section protrudes inward in the axial direction more than the inside end surface in the axial direction of the outer ring.

10. The rolling bearing unit with the encoder for supporting the wheel according to claim 6, wherein a concave section is formed in a center section in the radial direction of the cover such that the concave section protrudes to the outside in the axial direction from the flat plate section, or a convex section is formed in a center section in the radial direction of the cover such that the convex section protrudes to the inside in the axial direction from the flat plate section.

* * * * *